(12) United States Patent  
Degenhardt (10) Patent No.: US 7,669,067 B2
(45) Date of Patent: Feb. 23, 2010

(54) METHOD AND DEVICE FOR SETTING THE CLOCK FREQUENCY OF A PROCESSOR

(75) Inventor: Achim Degenhardt, Germering (DE)

(73) Assignee: Infineon Technologies AG, Munich (DE)

( * ) Notice: Subject to any disclaimer, the term of this patent is extended or adjusted under 35 U.S.C. 154(b) by 450 days.

(21) Appl. No.: 11/303,055

(22) Filed: Dec. 13, 2005

(65) Prior Publication Data

US 2006/0161799 A1 Jul. 20, 2006

(30) Foreign Application Priority Data

Dec. 13, 2004 (DE) .................. 10 2004 059 996

(51) Int. Cl.
*G06F 1/32* (2006.01)
(52) U.S. Cl. .................. 713/322; 713/320; 713/600
(58) Field of Classification Search .......... 713/320, 713/322, 323, 324, 600, 601
See application file for complete search history.

(56) References Cited

U.S. PATENT DOCUMENTS 5,719,800 A * 2/1998 Mittal et al. ............. 713/321
6,298,448 B1 10/2001 Shaffer et al.
6,470,456 B1 * 10/2002 Chung-Chih ............. 713/322
6,829,713 B2 * 12/2004 Cooper et al. ............ 713/320
7,000,138 B1 * 2/2006 Pillay et al. ............. 713/600
2003/0131269 A1 * 7/2003 Mizyuabu et al. ......... 713/320

FOREIGN PATENT DOCUMENTS

DE 699 07 512 T2 4/2004

* cited by examiner

*Primary Examiner*—Mark Connolly
*Assistant Examiner*—Paul B Yanchus, III
(74) *Attorney, Agent, or Firm*—Maginot, Moore & Beck (57) ABSTRACT

In order to set the clock frequency of a processor it is proposed that a processor load value be determined, representing a measure for the instructions carried out by the processor during a unit of time, and the clock frequency of a clock signal of the processor be set depending on the processor load value determined. To this end, an appropriately configured device has a clock signal source which provides the clock signal at a clock frequency which can be set depending on a clock frequency control signal. The processor load value is preferably determined by a time counter module which detects lengths of time during which the processor is in an inactive state. A control unit computes the value to which the clock frequency is set depending on a relative proportion of time $T_I$ during which the processor is in the inactive state. An input buffer memory co-operates with a data input of the processor and an output buffer memory co-operates with a data output of the processor, and allowance is preferably made for the degree to which they are full in order to adapt the clock frequency.

20 Claims, 4 Drawing Sheets

METHOD AND DEVICE FOR SETTING THE CLOCK FREQUENCY OF A PROCESSOR

FIELD OF THE INVENTION

The present invention relates to a method of setting the clock frequency of a processor, as well as a devic configured accordingly. The processor may be a digital signal processor in particular, for example for communication applications, or a micro-controller.

BACKGROUND

Digital signal processors and/or micro-controllers are being increasingly used in many commercial products. In this connection, it is common practice to assign a plurality of different tasks to the signal processors or micro-controllers, which requires a not inconsiderable computing capacity. However, this computing capacity varies, depending on the respective tasks to be processed. As a rule, a high computing capacity automatically implies a correspondingly higher energy uptake as well as a higher build-up of heat. Consequently, a technology which saves on energy is extremely important in the case of battery-operated or accumulator-operated products, not only to secure as long as possible an operating time in battery mode on the one hand, but also to avoid an unnecessary build-up of heat on the other.

A known method of reducing the energy uptake of a digital signal processor or micro-processor is to reduce the clock frequency of the processor so that the available computing capacity is adapted to a worst-case requirement in terms of computing power for the respective algorithm or program being run. In principle, the maximum computing capacity necessary for each program run or for each algorithm run is summed and the clock frequency is adapted to this computing capacity. As a rule, however, algorithms and programs require far less than the worst-case computing capacity on average. Consequently, although an energy saving is achieved by this known method, there is still considerable leeway for further energy savings.

Another method of reducing energy uptake is based on stopping the clock signal of the signal processor or micro-controller when all tasks have been processed. This being the case, the clock signal continues to be stopped until one of the programs to be run or one of the algorithms to be run requires processor capacity again. Since the signal processor or micro-controller is either fully active or totally inactive with this method, current peaks occur when the signal processor or micro-controller is activated or deactivated. Particularly in situations where the signal processor or micro-controller is designed as an integrated circuit on a semiconductor chip or forms part of such a circuit, this can cause problems because the extreme modulation of the power uptake can lead to cross-coupling with other components, for example with analogue-to-digital converters or digital-to-analogue converters.

SUMMARY

The objective of the present invention is to propose a method and a device for setting the clock frequency of a processor, by means of which the energy consumption or uptake of the processor can be reduced, whilst simultaneously guaranteeing a high reliability as regards the processing of tasks to be run by the processor.

This objective is achieved by a method and by a device according to embodiments of the invention.

The approach adopted by at least some embodiments of the invention is based on a method of determining a processor load value or a processor capacity utilisation value representing a measure of the instructions run by the processor within a unit of time and setting the clock frequency of a clock signal of the processor depending on the processor load value determined. As a result, the instantaneous computing capacity requirement can be determined precisely and the actual computing capacity made available can be adapted to this requirement via the clock frequency. Since the actual instantaneous computing capacity requirement is considerably less than the worst-case requirement for computing capacity as a rule, this enables a significantly lower energy uptake or power uptake of the processor to be achieved. Since the computing capacity made available is adapted to the actual computing capacity required, there are barely any or even no more inactive phases of the processor during which no tasks are waiting to be processed.

In a preferred example of an embodiment of the method, data to be processed by the processor is temporarily stored in an input buffer memory. It is also preferable to store data processed by the processor temporarily in an output buffer memory. Temporarily storing data means that even if the actual computing power requirement has been under-estimated, the data can be processed in real time on the basis of the processor load value, because reception of the data at a data input of the processor and output of data at a data output of the processor is guaranteed.

When using the input and/or output buffer memory, it is also preferable if the clock frequency of the processor is adapted on the basis of how full the input buffer memory or output buffer memory is. In this respect, the clock frequency is generally selected so that it is higher, the fuller the input buffer memory is. Likewise, the selected clock frequency is higher, the lower the degree to which the output buffer memory is full. This being the case, a desired level is set for the input buffer memory and/or the output buffer memory. If it is exceeded or there is a drop below it, the clock frequency is increased. Adapting the clock frequency in this manner enables the computing power made available to be adapted to the necessary requirement efficiently, especially in the range where the value of processor load is high.

However, it is preferable if not only the value of the level of the input buffer memory or output buffer memory is taken into account for the purpose of adapting the clock frequency, but also its change over time. For example, an increase in the level of the input buffer memory at a high speed implies that the computing capacity made available is much too low. In this case, a correspondingly high increase in the clock frequency is applied. A drop in the level of the output buffer memory at a high speed likewise indicates that the computing capacity made available is much too low. In order to counteract this, a significant increase in the clock frequency is also applied in this situation.

The process of determining the processor load value preferably involves detecting an inactive state of the processor during which the processor is not carrying out any instructions or during which no tasks are waiting to be processed. Once an inactive state has been detected, the relative proportion of time during which the processor has been in the inactive state is detected. This can be achieved, for example, by detecting the lengths of time during which the processor is in the inactive state over a specific period and summing these lengths of time. The relative proportion of time during which the processor has been in the inactive state will then be obtained as the quotient of the summed amounts of time and the specific period. The relative proportion of time during which the processor is in the inactive state is preferably detected by means of a time counter, which is started when the processor enters the inactive state and which is switched off when the processor is switched from the inactive state by new instructions to be carried out or new tasks to be processed and enters the active state. Naturally, it would also be possible to start the time counter when the processor is switched out of the inactive state into the active state and stop the time counter when the processor leaves the active state and enters the inactive state. In this case, the proportion of time detected would be that during which the processor is not in the inactive state, i.e. is in an active state.

The clock frequency to be set is then preferably calculated depending on the instantaneous value of the clock frequency and the relative proportion of time during which the processor is in the active or inactive state. In principle, this can be achieved by multiplying the instantaneous value of the clock frequency by the relative proportion of time during which the processor is not in the inactive state, i.e. is in the active state. The relative proportion of time during which the processor is in the inactive or active state multiplied by the instantaneous value of the clock frequency constitutes a precise measure for the instantaneous computing capacity made available but not required and for the instantaneous computing capacity required. Consequently, the clock frequency can be adapted to the instantaneous computing capacity requirement particularly precisely on the basis of this processor load value. In order to avoid too low a computing capacity by setting too low a clock frequency as far as possible, it is preferable to set a new value calculated for the clock frequency on the basis of the processor load value and increase it by an extra safety supplement, which may be obtained by addition or multiplication.

During a setting phase in which lengths of time might occur during which the processor is in the inactive state, it is also preferable to stop the processor clock whilst the processor is in the inactive state. This enables energy uptake to be reduced during the setting phase. However, as soon as the clock frequency has been adapted to the instantaneous computing capacity requirement, the inactive state of the processor occurs only rarely or not at all, which means that cross-couplings due to a high modulation of the current uptake of the processor are avoided.

The device proposed by the invention as a means of setting the clock frequency of a processor comprises a clock signal source which generates a clock signal, the clock frequency of which can be set by means of a clock frequency control signal. The device also has control means for setting the clock frequency, which control means is programmed to determine a processor load value representing a measure for the instructions carried out by the processor during a unit of time and generate the control signal for the clock signal source depending on the processor load value determined. As a result, the device is able to reduce the energy uptake of the processor by adapting the available computing power exactly to the instantaneous computing capacity required, whilst simultaneously ensuring reliable processing of the tasks by the processor.

The device preferably has an input buffer memory, which co-operates with a data input of the processor, and preferably also an output buffer memory which co-operates with a data output of the processor. The input buffer memory and/or the output buffer memory may be operated separately by memory hardware specifically provided for this purpose.

In an example of a preferred embodiment, the input buffer memory and/or the output buffer memory is/are operated as part of a data memory, in which case the processor is configured to control the data memory so that data to be processed by the processor is temporarily stored in an area of the data memory used as an input buffer memory before it is processed and data processed by the processor is temporarily stored in an area of the data memory used as an output buffer memory. This is preferably operated by means of an appropriately configured software which is run by the processor. This not only simplifies the design of the device but also increases its flexibility. In particular, the size of the input buffer memory and the output buffer memory can be adapted to suit requirements.

The control means may also be operated in the form of a separate hardware module. Here too, however, it is preferable if the control means is operated by the processor, in which case the processor is configured, as described above, to determine the processor load value and set the clock frequency depending on the determined processor load value. This may in turn be achieved by using an appropriately configured software, which is run by the processor. This considerably simplifies the design of the device because the functions of the control means are run by the processor.

The processor is preferably a digital signal processor or a micro-controller. By preference, the device proposed by the invention is disposed on a semiconductor chip, optionally in conjunction with other components.

The present invention enables the clock frequency of a processor, for example a digital signal processor or a micro-controller, to be regulated efficiently in order to minimise its power uptake. Since the computing capacity made available on the basis of the clock frequency is adapted to the instantaneously required computing capacity, both a minimum power uptake and reliable processing of the tasks of the processor are guaranteed. Due to the preferred approach of using an input and output buffer memory, tolerance with respect to a temporary drop below the requisite computing capacity, especially in situations where the computing capacity requirement changes, can be increased.

Other properties and advantages of the present invention will become apparent from the following description of examples of preferred embodiments, explained with reference to the appended drawings.

DETAILED DESCRIPTION

Figure 1:
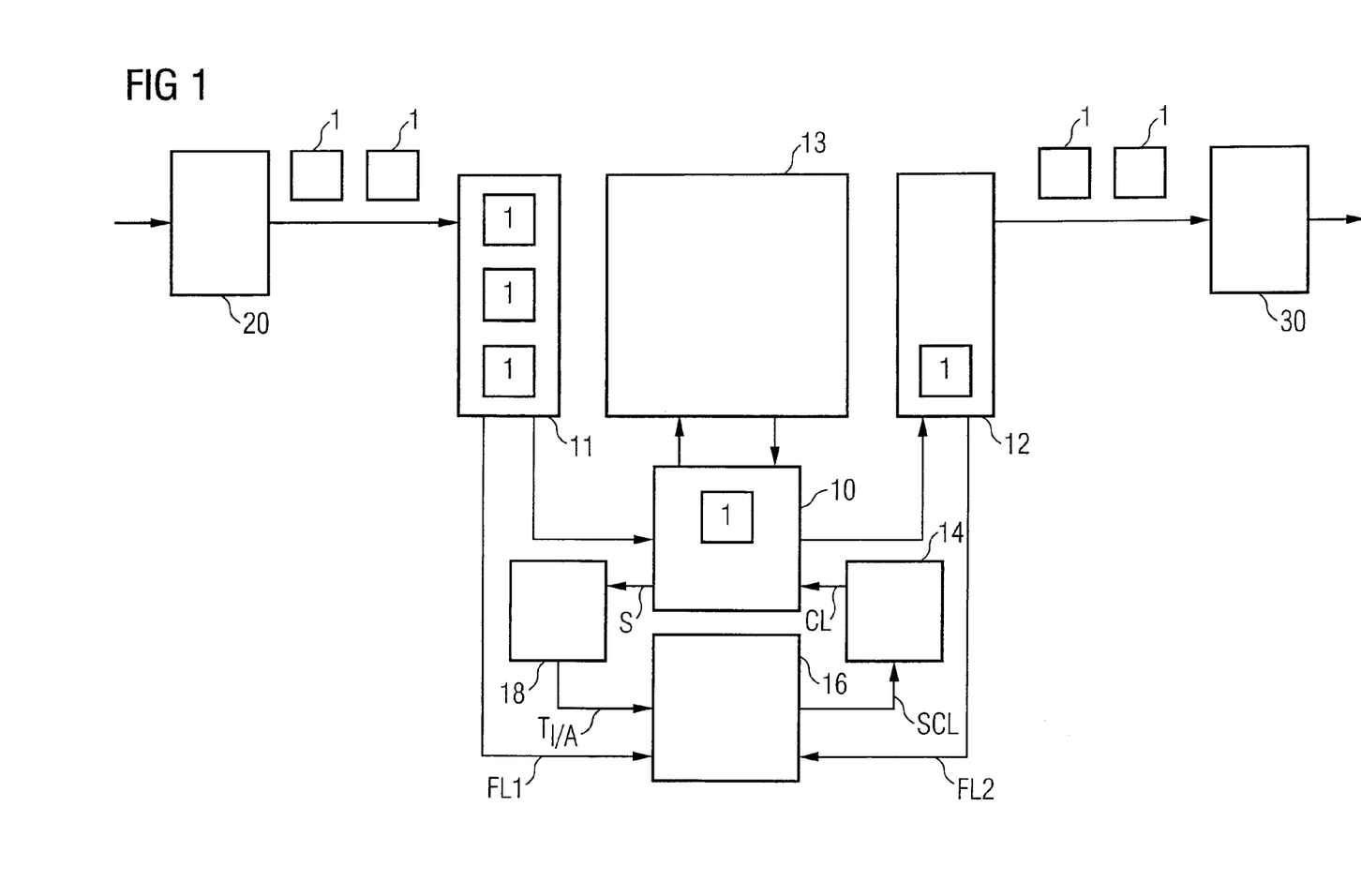
FIG. 1 is schematic diagram showing a circuit layout with a signal processor, provided with a device for setting the clock frequency in accordance with one example of an embodiment of the invention.

FIG. 1 illustrates a circuit layout with a signal processor 10, which will generally be referred to as processor 10 below. The processor 10 processes data 1, which is converted into digital format by an analogue-to-digital converter 20. The data 1 may be voice data in particular, which is processed in the context of a digital communication application. Processing by the processor 10 takes place on the basis of an appropriately configured software, i.e. on the basis of a program or algorithm, which program or algorithm contains instructions to be carried out by the processor 10. For this purpose, the processor 10 is connected to a data memory 13, in which the processor 10 stores previous processing results on which it subsequently draws for further processing. The data memory 13 may also contain a program code, incorporating the instructions to be carried out by the processor 10. This program code may be copied into the data memory 13 beforehand from a non-volatile ROM memory (not illustrated).

The processor 10 receives its clock signal from a clock signal source 14. The clock signal source 14 is configured to generate the clock signal CL at a frequency f which can be set by means of a clock signal control signal SCL. In the description below, it is assumed that the processor 10 carries out an instruction with every clock cycle of the clock signal CL. However, the process of setting and adapting the clock signal described below may just as easily be used with processors which carry out more than one instruction in a clock cycle.

Co-operating with a data input of the processor 10 is an input buffer memory 11, in which the data 1 transmitted from the analogue-to-digital converter 20 is temporarily stored before being processed by the processor 10. Provided at a data output of the processor 10 is an output buffer memory 12, in which data 1 processed by the processor 10 is temporarily stored before being output to the digital-to-analogue converter 30.

The input buffer memory 11 generates a level signal FL1, reflecting how full the input buffer memory 11 is. The output buffer memory 12 generates a level signal FL2, reflecting how full the output buffer memory 12 is. The level signals FL1 and FL2 are forwarded to control means in the form of a control unit 16, which processes the level signals FL1 and FL2, as a function of which the clock signal control signal SCL is generated.

A time counter module 18 is also provided, which is configured to detect, over time, lengths of time during which the processor 10 is in an active or an inactive state. To this end, the processor 10 is configured to generate a status signal S, irrespective of whether tasks are waiting to be processed or not. If no tasks are waiting to be processed, the status signal S prompts a time counter in the time counter module 18 to be started. The time counter continues to run as long as the processor 10 is in the inactive state, i.e. is not processing instructions. As soon as a new task occurs for the processor 10 to process, for example on receipt of new data 1, the status signal S prompts the time counter in the time counter module 18 to be stopped. In this manner, lengths of time during which the processor is in the inactive state are detected by the time counter module 18. Alternatively or in addition, it would also be possible to detect lengths of time during which the processor 10 is in the active state, i.e. is carrying out instructions, in which case the time counter is started when a new tasks arrives for the processor 10 and stopped when there are no tasks for the processor 10. In order to achieve an additional energy saving, the clock signal CL is stopped whilst the processor 10' is in the inactive state.

The lengths of time detected in the time counter module 18 are added. This can be operated in such a way that when stopped, the time counter holds its value and starts counting from this value again when started up again. Alternatively, the time counter may also be re-set after every counting process and the lengths of time can be added by an adder. The time counter is re-set at regular intervals, for example at intervals of 30 milli-seconds or 60 milli-seconds. At the same time, a total time counter which continues counting irrespective of whether the processor 10 is in the active or inactive state, i.e. measures the total time, is also re-set. Prior to each re-setting routine, the ratio of the added lengths of time to the total time is computed, i.e. the quotient $$T_I = \frac{t_I}{t_T}$$

in which $t_I$ denotes the sum of the lengths of time during which the processor 10 was in the inactive state, $t_T$ denotes the total time detected by the total time counter and $T_I$ denotes the relative proportion of time during which the processor was in the inactive state.

If lengths of time during which the processor was in the active state are detected in the time counter module 18, the ratio of the sum of the lengths of time in which the processor 10 was in the active state and the total time are computed accordingly, i.e. the quotient $$T_A = \frac{t_A}{t_T}$$

in which $t_A$ denotes the sum of the lengths of time during which the processor 10 was in the active state and $T_A$ the relative proportion of time during which the processor 10 was in the active state.

Naturally, the following applies $$T_A = 1 - T_I$$

i.e. it is generally sufficient to determine one of the two variables $T_A$ or $T_I$. Without imposing any restrictions on this variant, it is assumed in the description below that the relative proportion of time $T_I$ during which the processor 10 was in the inactive state is detected by the time counter module 18. The value of the relative proportion of time $T_I$ detected by the time counter module 18 is forwarded to the control unit 16 by means of a corresponding signal.

The control unit 16 computes the new value of the clock frequency f to be set as a function of the relative proportion $T_I$ and as a function of the instantaneous clock frequency $f_M$. This is done on the basis of the following equation $$f = (1 - T_I) f_M + A,$$

in which A denotes an additive safety supplement which is added on in order to avoid too low a computing capacity being made available. Alternatively, it would also be possible to use a multiplication safety supplement B and compute the value to be set for the clock frequency f on the basis of $$f = [(1 - T_I) f_M] B.$$

In both cases, it goes without saying that if the computed value lies above a maximum clock frequency of the processor 10, this maximum value of the clock frequency is used as the new value to be set. The clock frequency f is set whenever a new value is available for the relative proportion $T_I$.

The level signals FL1 and FL2 are also forwarded to the control unit. The clock frequency f is adapted depending on these level signals FL1 and FL2. Generally speaking, the adapted clock frequency f is selected so as to be higher, the higher the degree to which the input buffer memory 11 is full and the lower the degree to which the output buffer memory 12 is full.

The clock frequency f is adapted on the basis of the level at regular intervals, although these need not coincide with the time intervals at which the clock frequency f is set on the basis of the processor load value. Accordingly, the time intervals at which the clock frequency f is adapted on the basis of the level of the input buffer memory 11 and the output buffer memory 12 are selected depending on the size of the input buffer memory 11 and the output buffer memory 12. This specifically means that the clock frequency f is adapted more often, the smaller the size of the input buffer memory 11 and the output buffer memory 12.

In order to adapt the clock frequency f depending on the degree to which the output buffer memory 12 is full, the level of the output buffer memory 12 is compared with a pre-set desired level. The farther the level falls below the desired level, the more the clock frequency f is adjusted upwards. This may take place as part of a proportional regulation, for example, whereby the clock frequency f is adapted by an amount proportional to the difference between the level of the output buffer memory 12 and the pre-set desired level. Accordingly, the level of the output buffer memory 12 can be restored to the pre-set desired level due to the increased computing capacity made available, so that data 1 is always available in the output buffer memory 12.

The same procedure is used to adapt the clock frequency f depending on how full the input buffer memory 11 is. In other words, the level of the input buffer memory 11 is compared with a pre-set desired level and the clock frequency f is adjusted increasingly upwards the more the level exceeds the pre-set desired level of the input buffer memory 11. The clock frequency f is therefore adjusted increasingly upwards, the more full the level of the input buffer memory is. This can be done on the basis of a proportional regulation whereby the clock frequency f is adapted by an amount proportional to the difference between the level and the desired level of the input buffer memory 11. This guarantees that when an increased computing capacity is made available, the high level of the input buffer memory 11 is reduced and can be adjusted to the pre-set desired level, thereby preventing the input buffer memory from overflowing.

When adapting the clock frequency f, allowance can be made for the change in the level of the input buffer memory 11 or output buffer memory 12 over time. This can be achieved by establishing the difference of the level from a level determined during the preceding adaptation routine. Since the clock frequency f is adapted at regular time intervals, this provides a simple means which can be used as a measure of the change in level over time. Accordingly, the clock frequency f is adjusted increasingly upwards, the more quickly the level of the input buffer memory increases and the more quickly the level of the output buffer memory 12 decreases. Since both an increase in the level of the input buffer memory 11 associated with high speed and a decrease in the level of the output buffer memory 12 also associated with high speed indicates that the computing capacity made available is much too low, this can be used to adapt the available computing capacity more rapidly and more effectively to the instantaneous computing capacity requirement.

In the situations described above, adaptation of the clock frequency f is dependent on the degree to which the input buffer memory 11 is full as well as the degree to which the output buffer memory 12 is full. Since the levels of the input buffer memory 11 and the output buffer memory 12 are not independent of one another, the process of adapting the clock frequency f can be simplified, specifically in the situation where data 1 arrives in the input buffer memory 11 at regular intervals and is available at the output buffer memory 12 at regular intervals, by using only one level, either the level of the input buffer memory 11 or the output buffer memory 12 as the basis for adapting the clock frequency f. Especially in the situation where the data 1 arrives in the input buffer memory 11 at irregular intervals and/or is taken from the output buffer memory 12 at irregular intervals, however, it is of advantage to use both levels as a basis for adapting the clock frequency f.

FIG. 1 illustrates the input buffer memory. 11, the data memory 13 and the output buffer memory 12 as separate components. The control unit 16 is likewise provided as a separate component. This diagram corresponds to an embodiment of setting the clock frequency f in which separate hardware modules are provided respectively for the input buffer memory 11, the output buffer memory 12 and the control unit 16.

Figure 2:
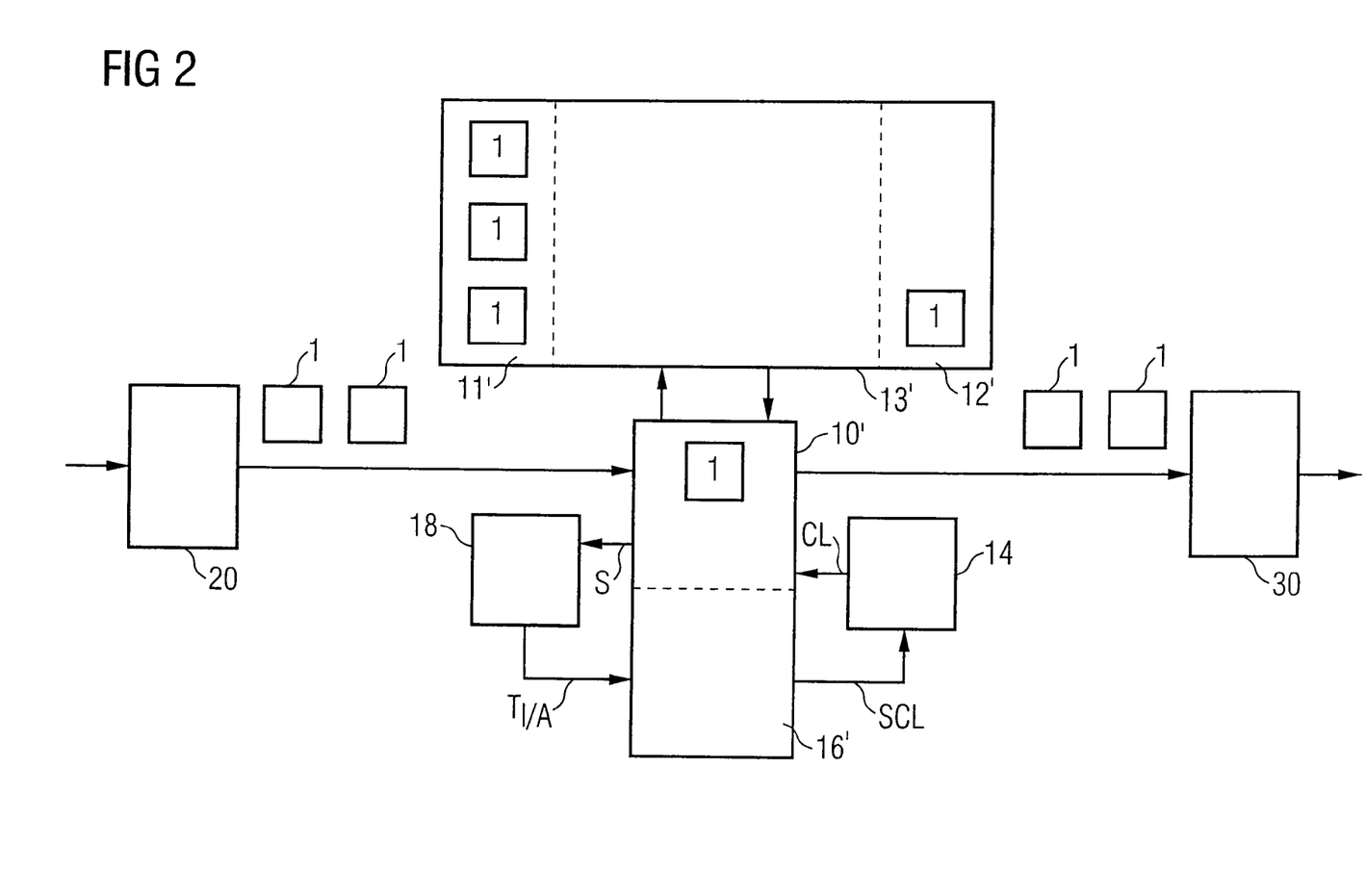
FIG. 2 illustrates another circuit layout with a signal processor, which is provided with a device for setting the clock frequency of the signal processor in accordance with another example of an embodiment of the invention.

FIG. 2 illustrates another example of a circuit layout, with a signal processor 10', which will generally be referred to as processor 10' below. The components of the circuit layout illustrated in FIG. 2 basically correspond to the components illustrated in FIG. 1 and are denoted by the same reference numbers. By contrast with FIG. 1, however, an input buffer memory 11' and an output buffer memory 12' are designed as part of a data memory 13'. The processor 10' is also configured so that, in addition to processing the data 1, it also runs the functions of the control unit 16'. This is achieved by means of an appropriately configured program code, which is run by the processor 10'.

In order to incorporate the input buffer memory 11' and the output buffer memory 12' in the data memory 13', a program code is provided which controls the data memory 13' in such a way that data 1 to be processed by the processor 10' is temporarily stored in an area of the data memory 13' earmarked as an input buffer memory prior to processing. Data processed by the processor 10' is likewise temporarily stored in an area of the data memory 13' earmarked as an output buffer memory 12' after processing before being output. The input buffer memory 11' and the output buffer memory 12' are therefore operated by means of software. The advantage of this is that the input buffer memory 11' and the output buffer memory 12' do not have to be of a fixed size and instead can be adapted to requirements in the context of the memory space available in the data memory 13'. This approach therefore guarantees greater flexibility and less complex implementation.

The control unit 16' in the circuit layout illustrated in FIG. 2 is also operated by means of an appropriately configured program code, which is run by the processor 10', i.e. by means of software. This means that the processor 10' is configured by means of the program code to run the steps described in connection with FIG. 1 as a means of setting and adapting the clock frequency f. To this end, the processor 10', which also assumes control of the data memory 13' in order to operate the input buffer memory 11' and the output buffer memory 12', determines the requisite information relating to the degree to which the input buffer memory 11' and the output buffer memory 12' is full. Furthermore, the relative proportion of time $T_I$ respectively $T_A$ during which the processor 10' is in the inactive or active state is forwarded to the processor 10' from the time counter module 18. On the basis of the processor load value represented by the relative proportion of time $T_I$ respectively $T_A$, the processor 10' computes the value to be set for the clock frequency f at regular time intervals and on this basis generates the control signal SCL for the clock signal source 14. The processor 10' also takes control of adapting the clock frequency f on the basis of the levels to which the input buffer memory 11' and the output buffer memory 12' are full at regular time intervals.

The fact that the control unit 16' is operated by means of a program code run by the processor 10' guarantees a significantly lower operating complexity.

The time counter module 18 is provided in the form of hardware independent of the processor 10'. This ensures that the lengths of time during which the processor 10' is in the active or inactive state are measured independently of the clock frequency f set at any one time. This also enables the clock signal CL to be stopped whilst the processor 10' is in the inactive state. This can take place when no data 1 is being received, for example. Accordingly, the processor 10' would be switched from the inactive state into the active state on receiving data 1.

If no provision is made to stop the clock signal CL during the inactive state of the processor 10', the time counter module 18 may naturally also be operated by means of a program code 10 run by the processor 10', in the same way as described above in respect of the control unit 16'.

In the method of operating the input buffer memory 11', the output buffer memory 12' and the control unit 16' on the basis of a program code run by the processor 10', as described above, it is basically preferable to accord a high priority to the program code which activates the data memory 13' in order to take control of the input buffer memory 11' and the output buffer memory 12' and to the program code which operates the functions of the control unit 16'. As a result, activation of the input buffer memory 11' and activation of the output buffer memory 12' as well as the setting and adaptation of the clock frequency f are guaranteed, even in the situation where the computing capacity made available is too low for a brief period.

Figure 3:
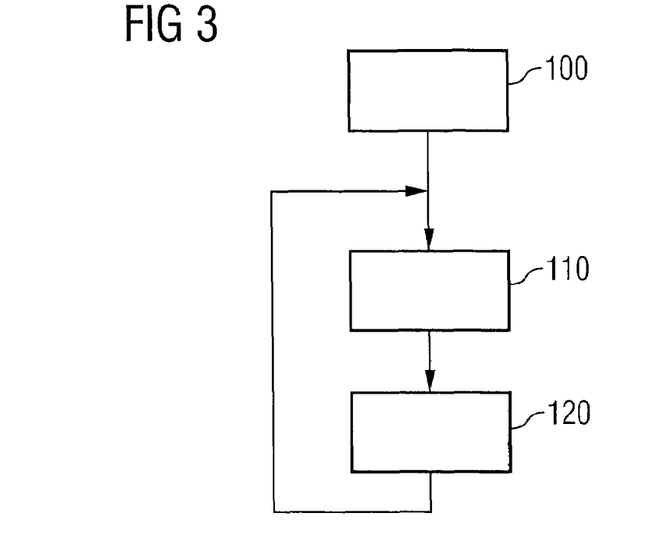
FIG. 3 is a flow chart illustrating an example of an embodiment of a method proposed by the invention for setting the clock frequency of a processor.

FIG. 3 shows a flow chart, diagrammatically illustrating the sequence of the method for setting the clock frequency f. The methods starts with initialisation step 100, during which an initial reading is taken of the input buffer memory and the output buffer memory, for example on the basis of the levels to which they are filled with data, corresponding to zero values. Values are also defined for desired levels of the input buffer memory and the output buffer memory and an initial clock frequency set. The initial clock frequency may be a maximum clock frequency for which the processor is suitable, for example.

In the determination step 110, the processor load value is determined, in particular on the basis of the relative proportion of time $T_r$ respectively $T_A$ during which the processor is in the inactive or active state, as described above. At setting step 120, the value to be set for the clock frequency f is computed on the basis of the determined processor load value and the clock frequency set accordingly. The determination step 110 and the setting step 120 are repeated at regular time intervals, for example 30 milli-seconds or 60 milli-seconds.

Figure 4:
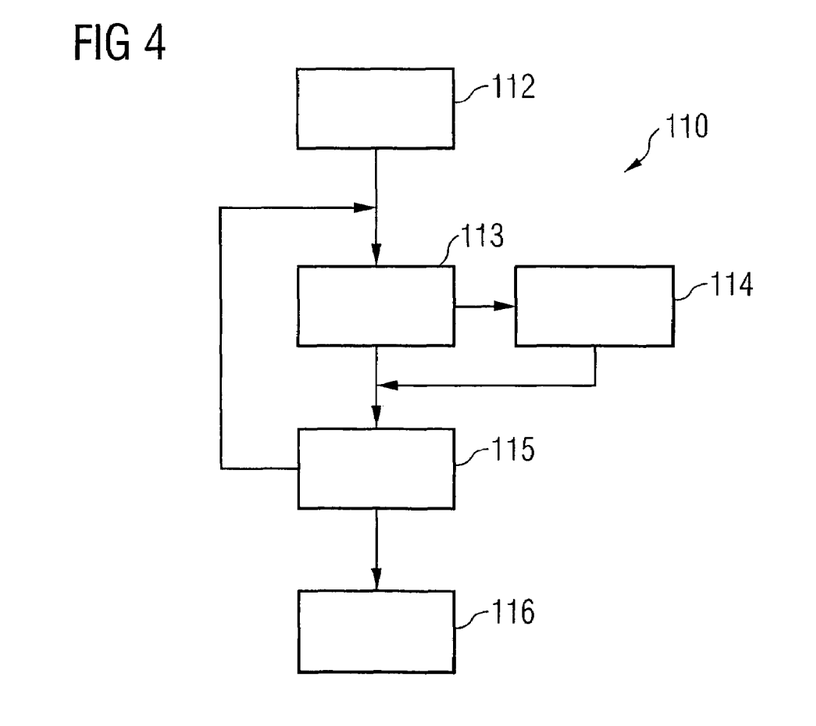
FIG. 4 is a flow chart illustrating how a processor load value is determined on the basis of one example of an embodiment of the method proposed by the invention.

FIG. 4 is a flow chart illustrating how the processor load value is determined at determination step 110. At the time counter initialisation step 112, the time counter in the time counter module is initialised. In particular, the time counter and the total time counter are re-set.

During the checking step 113, a check is run to ascertain whether the processor has switched from the active to the inactive state or vice versa. If such is the case, the time counter is started or stopped during the time counter control step 114.

The repeat step 115 prompts the checking step 113 and optionally also the time counter control step 114 to be repeated until the total time counter has reached a pre-set value, for example 30 milli-seconds or 60 milli-seconds. If such is the case, the ratio of the values of the time counter and the total counter are established at the computation step 116 in order to determine the processor load value as the relative proportion of time $t_r$ or $T_A$ during which the processor is in the inactive state and in the active state.

Figure 5:
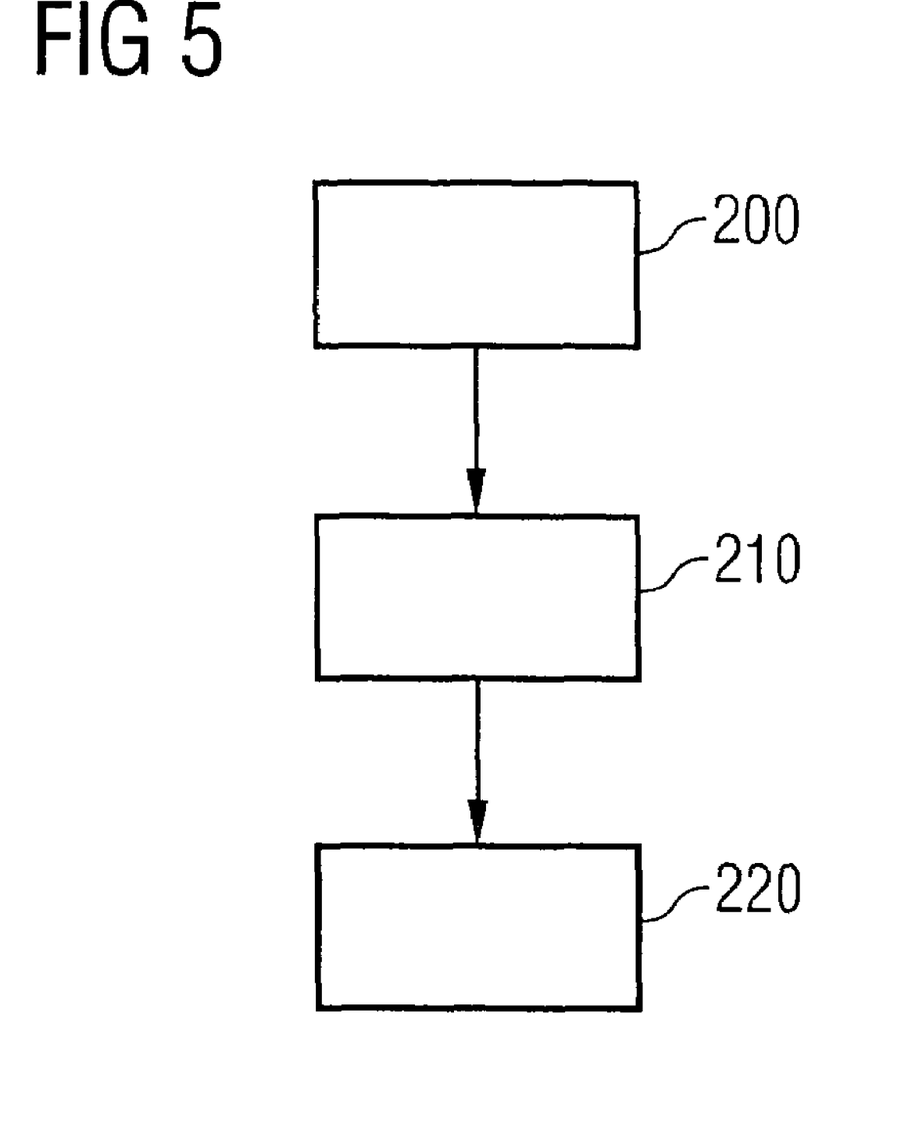
FIG. 5 is a flow chart illustrating how the clock frequency is adapted depending on how full the input buffer memory and/or output buffer memory is/are, in accordance with an example of an embodiment of the method proposed by the invention.

FIG. 5 is a flow chart illustrating how the clock frequency is adapted depending on the level of the input buffer memory or the output buffer memory.

At the determination step 200, the level of the input buffer memory or the output buffer memory is determined.

At the comparison step 210, a comparison is made between the determined level and the pre-set desired level, whereby the difference between the determined level and the pre-set desired level is determined in particular. At the same time, the difference between the determined level and a level determined during the preceding adaptation of the clock frequency is also established, thereby enabling the change in level to be detected.

During the adaptation step 220, the clock frequency is adapted by an adaptation value, which is selected depending on the differences determined in the comparison step 210, in the manner explained above with reference to FIG. 1.

The sequence illustrated in FIG. 5 as a means of adapting the clock frequency may be integrated in the method sequence illustrated in FIG. 3. However, it would also be possible to adapt the clock frequency independently of the method sequence for setting the clock frequency, for example by means of a time-controlled interrupt.

The method described and the devices explained here relate to the example of a signal processor, for example for a communication application. The described approach for setting the clock frequency is especially well suited to communication applications based on GSM networks or WLAN networks, and so-called VoIP applications, in which the signal propagation times are time-delayed due to the technology and an additional delay due to the use of the input buffer memory and the output buffer memory can be tolerated without any problem. However, an ISDN or POTS application would also be conceivable, in which case the size of the input buffer memory and the output buffer memory is adapted to the maximum desired signal propagation time. The approach described here may also be used to advantage with microcontrollers.

The invention claimed is:

1. A method of setting the clock frequency of a processor, comprising the following steps:
    determining a processor load value representing a measure for the instructions carried out by the processor during a unit of time, wherein at least some data processed by the processor is temporarily stored in an input buffer memory, the processor load value determined by
        detecting an inactive state of the processor during which the processor is not carrying out any instructions,
        detecting lengths of time during which the processor is in the inactive state over a specific period of time,
        determining a total time by summing the detected lengths of time, and
        calculating a relative proportion of time during which the processor has been in the inactive state as the quotient of the total time and the specific period of time;
    setting the clock frequency of a clock signal of the processor depending on the determined processor load value; and
    adapting the clock frequency depending on a degree to which the input buffer memory is full.

2. The method as claimed in claim 1, comprising the following step:

adapting the clock frequency depending on a change in a degree to which the input buffer memory is full over time.

3. The method as claimed in claim 1, wherein at least some data processed by the processor is temporarily stored in the output buffer memory.

4. The method as claimed in claim 3, comprising the following step:
adapting the clock frequency depending on a degree to which the output buffer memory is full.

5. The method as claimed in claim 3, comprising the following step:
adapting the clock frequency depending on a change in a degree to which the output buffer memory is full over time.

6. The method as claimed in claim 1, wherein a value to which the clock frequency is set is computed depending on an instantaneous value of the clock frequency and the relative proportion of time.

7. The method as claimed in claim 6, wherein the value computed depending on the instantaneous value of the clock frequency and the relative proportion of time is increased by a safety supplement.

8. The method as claimed in claim 1, comprising the following step:
stopping the clock signal while the processor is in the inactive state.

9. A device for setting the clock frequency of a processor, comprising:
a clock signal source which is configured to generate a clock signal, the clock frequency of which can be set depending on a control signal,
a control unit configured to set the clock frequency, the control unit further configured to determine a processor load value representing a measure for the instructions carried out by the processor during a unit of time, wherein at least some data processed by the processor is temporarily stored in an input buffer memory, the processor load value determined by
detecting an inactive state of the processor during which the processor is not carrying out any instructions,
detecting lengths of time during which the processor is in the inactive state over a specific period of time,
determining a total time by summing the detected lengths of time, and
calculating a relative proportion of time during which the processor has been in the inactive state as the quotient of the total time and the specific period of time,
the control unit further configured to generate the clock frequency control signal for the clock signal source depending on the determined processor load value; and to adapt the clock frequency depending on a degree to which the input buffer memory is full.

10. The device as claimed in claim 9, further comprising the input buffer memory which cooperates with a data input of the processor.

11. The device as claimed in claim 10, wherein the input buffer memory is operated as part of a data memory and the processor is configured to control the data memory so that data to be processed by the processor is temporarily stored in an area of the data memory before being processed.

12. The device as claimed in claim 9, further comprising:
an output buffer memory which cooperates with a data output of the processor.

13. The device as claimed in claim 12, wherein the output buffer memory is operated as part of a data memory and the processor is configured to control the data memory so that data processed by the processor is temporarily stored in an area of the data memory before it is output via the data output.

14. The device as claimed in claim 9, wherein the processor is further configured to carry out the function of the control unit.

15. The device as claimed in claim 9, wherein the processor comprises a digital signal processor or micro-controller.

16. The device as claimed in claim 9, wherein the clock signal source, the control unit and the processor are supported by a single semiconductor chip.

17. A method of setting the clock frequency of a processor, comprising the following steps:
determining a processor load value representing a measure for the instructions carried out by the processor during a unit of time, wherein at least some data processed by the processor is temporarily stored in an input buffer memory, the processor load value determined by
detecting an inactive state of the processor during which the processor is not carrying out any instructions,
detecting lengths of time during which the processor is not in the inactive state over a specific period of time,
determining a total time by summing the detected lengths of time, and
calculating a relative proportion of time during which the processor is not in the inactive state as the quotient of the total time and the specific period of time;
setting the clock frequency of a clock signal of the processor depending on the determined processor load value; and
adapting the clock frequency depending on a degree to which the input buffer memory is full.

18. The method as claimed in claim 17, wherein a value to which the clock frequency is set is computed depending on an instantaneous value of the clock frequency and the relative proportion of time.

19. The method as claimed in claim 18, wherein the value computed depending on the instantaneous value of the clock frequency and the relative proportion of time is increased by a safety supplement.

20. A device for setting the clock frequency of a processor, comprising:
a clock signal source which is configured to generate a clock signal, the clock frequency of which can be set depending on a control signal,
a control unit configured to set the clock frequency, the control unit further configured to determine a processor load value representing a measure for the instructions carried out by the processor during a unit of time, wherein at least some data processed by the processor is temporarily stored in an input buffer memory, the processor load value determined by
detecting an inactive state of the processor during which the processor is not carrying out any instructions,
detecting lengths of time during which the processor is not in the inactive state over a specific period of time,
determining a total time by summing the detected lengths of time, and
calculating a relative proportion of time during which the processor has not been in the inactive state as the quotient of the total time and the specific period of time,
the control unit further configured to generate the clock frequency control signal for the clock signal source depending on the determined processor load value; and to adapt the clock frequency depending on a degree to which the input buffer memory is full.

* * * * *